United States Patent
Ritscher et al.

[19]

[11] Patent Number: 5,838,974
[45] Date of Patent: Nov. 17, 1998

[54] METHOD FOR ACTIVATING OR RATHER DEACTIVATING SUBPROGRAMS USING VIEWS CONTROLLED VIA PROGRAM ATTRIBUTES IN AN AUTOMATION SYSTEM BASED PREFERABLY ON STATE GRAPHS

[75] Inventors: Christian Ritscher, Obermichelbach; Joerg Middel, Weisendorf; Roland Schneider, Erlangen; Dieter Wissmann, Effeltrich; Guenther Rath, Erlangen, all of Germany

[73] Assignee: Siemens Aktiengesellschaft, Munich, Germany

[21] Appl. No.: 543,662

[22] Filed: Oct. 16, 1995

[30] Foreign Application Priority Data

Oct. 14, 1994 [EP] European Pat. Off. .............. 94116315

[51] Int. Cl.$^6$ .................................................. G06F 9/45
[52] U.S. Cl. .............................................................. 395/702
[58] Field of Search ................................... 395/701, 705, 395/792, 604, 603, 601, 702

[56] References Cited

U.S. PATENT DOCUMENTS

| | | | |
|---|---|---|---|
| 4,901,250 | 2/1990 | Ishida ....................................... | 395/355 |
| 5,181,162 | 1/1993 | Smith et al. ............................. | 395/792 |
| 5,448,727 | 9/1995 | Annevelink ............................. | 395/612 |
| 5,586,316 | 12/1996 | Tanaka et al. .......................... | 395/604 |

FOREIGN PATENT DOCUMENTS 42 12 370 10/1993 Germany .

OTHER PUBLICATIONS

Elektrotechnik, vol. 76, No. 4, 14 Apr. 1994, Würzburg, DE, pp. 44–47; Alfred Friedrich: *Netz der Netze*.

ISA Transactions, vol. 32, No. 3, Oct. 1993, Amsterdam, NL, pp. 225–233; Richard P. Neidert et al.: *A new paradigm for industrial control system design*.

*Primary Examiner*—James P. Trammell
*Assistant Examiner*—Peter J. Corcoran, III
*Attorney, Agent, or Firm*—Kenyon & Kenyon

[57] ABSTRACT

For program creation, selected types of graphical objects ("State", "Action", "Transition", "Control Condition") and selected types of program attributes ("Basic", "Fault", "Automatic", "Manual", "Visible") are available. In the creation of an overall program, a plurality of graphical objects are brought into interrelation with one another in an application-dependent manner, and each graphical object of the overall program is assigned according to the invention a program attribute selected in an application-dependent manner. From the overall program, those graphical objects which have certain program attributes are combined in an application-dependent manner into activatable or rather deactivatable views representing subprograms.

5 Claims, 9 Drawing Sheets

Motor Standing

Fig. 3b

Motor Running

Fig. 3c

Operating Fault

Fig. 3d

General Emergency Stop

METHOD FOR ACTIVATING OR RATHER DEACTIVATING SUBPROGRAMS USING VIEWS CONTROLLED VIA PROGRAM ATTRIBUTES IN AN AUTOMATION SYSTEM BASED PREFERABLY ON STATE GRAPHS

BACKGROUND OF THE INVENTION

In automation systems, it is increasingly common to characterize and control the behavior of a technical system or rather a part thereof with the aid of graphical objects of a graphical programming, control and user interface. These objects can be designated as a "state graph", which is abbreviated to "graph" within the scope of the following specification. Such a graph has the advantage that the stationary and dynamic behavior of a technical system, e.g., a technical production facility, is completely visualized in the form of a well arranged, geometric presentation. Thus, particularly, the planning, programming, compilation, modification, documentation and execution of, e.g., in practice sometimes extremely complex open-loop and closed-loop control of technical processes are considerably simplified.

For the application-dependent creation of a graph, selected types of graphical objects are available which serve more or less as building blocks. Moreover, this is to be explained based on the example of so-called state graphs in which the graphical objects can be designated using the terms "State", "Action", "Transition" and "Switching Condition". An object of type "State" in a graph represents a possible static operating state of the related technical system, e.g., of a technical production facility or rather a system for data transmission. If the technical system can assume different operating states, which is generally the case, then a separate "State" object is present in the graph for each of these potential operating states. These form more or less the "reference points" of an overall graph characterizing the overall technical system.

The dynamic behavior of a technical system, i.e., the connections between the "State" objects which can be seen as static reference points, is characterized by an application-dependent arrangement of objects of the types "Action", "Transition" and "Switching Condition". Here, each "State" is maintained by an "Action". In the graph of an overall technical system, thus, each "State" object has assigned to it at least one object of type "Action" which maintains this system state. Transitions between states, i.e., changes in the operating state of the equipment of the technical system, are described by objects of type "Transitions". In terms of the symbol used, these transitions are represented in a graph by an arrow-like connection between one "State" object, which characterizes the starting state of the system, and another "State" object, which characterizes the destination state of the system. Finally, each "Transition" has assigned to it an object of type "Switching Condition". This contains a technical cause for which, when it occurs, the associated "Transition", i.e., the corresponding state transition, is activated. These "Switching Conditions" are provided in technical systems by detecting elements, sensors or input devices. Sensors automatically indicate the process conditions currently present at certain locations in the system and possibly relevant to the switching, whereas input devices can be used by the operating personnel of the system to enter switching conditions.

Technical graphs of the type described above are generated, edited and visualized using data processing equipment. As "generator systems", computer systems which have a graphical user interface are preferred. As systems of this sort, so-called "engineering stations", conventional PCs and also programmable controllers are well suited. From a created, i.e., an edited graph, a control program is subsequently derived, which is executed on a so-called "execution system". These are generally automation systems, in particular process control computers, programmable controllers or rather PCs, which serve to control a technical system or rather process. Likewise, the software conversion, i.e., compilation, of a graph into an executable control program, e.g., for an automation system serving as an execution system for a technical facility, can be handled by the generator system.

Figure 1:
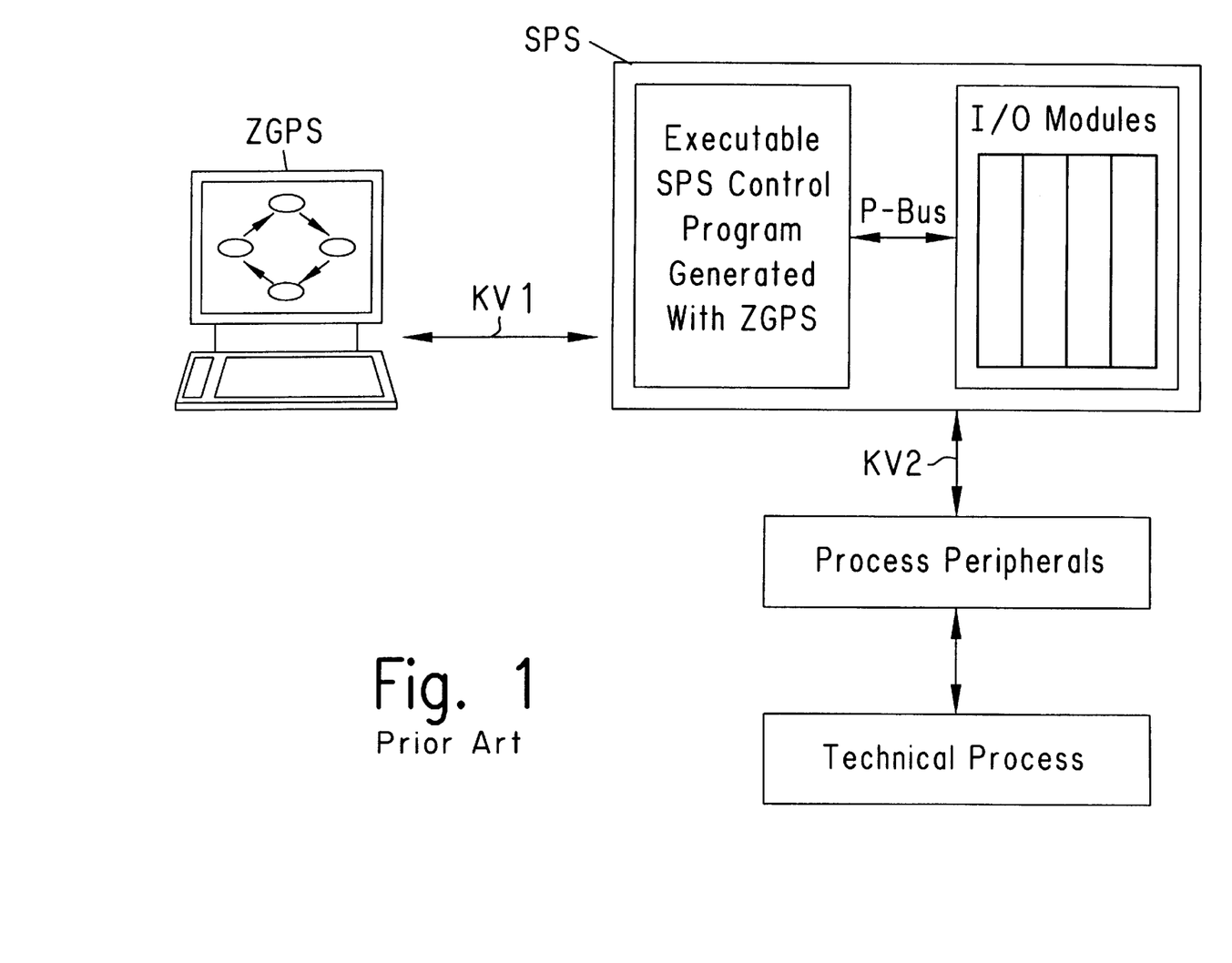
FIG. 1 illustrates the previously explained block diagram of an arrangement consisting of a "generator system" for control programs based on state graphs and an automation system serving as an "execution system".

In FIG. 1, an arrangement of this sort is depicted symbolically. As a "generator system" ZGPS, an engineering station is preferred which allows interactive, graphical creation of a program, e.g., for a programmable controller SPS serving as an execution system, with the aid of state graphs. The "source" of a state graph program created there is compiled preferably in the generator system ZGPS itself into a control program which is executable on the automation system SPS. The program is transferred via a communications link KV1 from the generator system ZGPS to the automation system SPS. As automation systems, controllers such as the Sinumerik 840D or Simatic S7 AS 300 from the company SIEMENS can be used.

In the automation system, the control program accesses the process peripherals via an internal P bus, a number of input and output modules (I/O modules) and a further communications interface KV2. The process peripherals are distributed sensors, actuators and functional units which assume the function of analog and binary detecting elements and control elements. Via this process interface, the technical process is influenced by the state graph control program which is edited in the generator system ZGPS in an application-dependent manner. The program determines the current states of detecting elements and sensors such as photo-electric readers, motion detectors, liquid level displays, temperature sensors and much more, and based on this information, controls functional units in production and materials processing such as motors, lathes, milling machines, production belts, high-bay warehouses, container filling mechanisms, temperature regulators, mixers, dosing systems and much more.

Despite the fact that the structures of a control program are not displayed in a classic line-by-line or tabular fashion but rather in a visual, two-dimensional, i.e., almost graphical, structural manner with the aid of graphs assembled from the objects, the problem exists here as well that the clarity of these structures is limited particularly in the case of complex control tasks on large technical systems. Due to the multitude of objects and "branches" which are then present, it becomes difficult to recognize subfunctions of the subprograms forming a state graph control program. Subfunctions of this sort can be, for example, the normal, fault, automatic and manual operation of an associated technical facility. Each subfunction is implemented using selected objects, i.e., "States" with "Actions" and/or "Transitions" with "Switching Conditions". Each single group of such objects then forms a subprogram.

SUMMARY OF THE INVENTION

The present invention is to allow application-dependent activation or rather deactivation of subprograms for technical systems characterized using graphical objects, in particular for open-loop and closed-loop control apparatuses based on state graphs.

This objective is solved with a method activating or deactivating subprograms from an overall program that provides open-loop and/or closed-loop control of a technical process, the method comprising the steps of (a) providing selected types of graphical objects ("State", "Action", "Transition", "Switching Condition") for program creation; (b) providing selected types of program attributes ("Basic", "Fault", "Automatic", "Manual", "Visible") for program creation; (c) bringing a plurality of graphical objects interrelations with one another in an application-dependent manner in the creation of an overall program; and (d) assigning to a program attribute selected in an application-dependent manner to each graphical object of the overall program; and (e) from the overall program, combining those graphical objects which have certain program attributes in an application-dependent manner into activatable or deactivatable views representing subprograms. Advantageous, further specific embodiments of the same are specified in the subsequent dependent claims.

The invention is based on the principle that the activation or rather deactivation of subprograms is made possible with the aid of "views" controlled via program attributes. The prerequisite for this is that in the creation of an overall program, a plurality of graphical objects being brought into interrelations with one another in an application-dependent manner, a program attribute selected in an application-dependent manner is also assigned to each graphical object of the overall program. In this manner, it is now possible, for the execution of the overall program, particularly on an automation system, to combine those graphical objects which have program attributes which are contained in a group of specific program attributes currently selected in an application-dependent manner into an associated so-called "view". A "view" is thus defined by an application-dependent selection of one or more or rather no program attributes. A "view" of this sort thus represents, due to the combination of objects of the overall program selected in an application-dependent manner, a subprogram of the same, which can be activated or rather deactivated.

The invention thus has the advantage that by way of "views" of this sort, subgraphs of state graphs are defined which in turn correspond to subprograms of an overall program. Theoretically, any allowable subgraph can serve as a possible "view". If, for example, in a "generator system" for graphs, a certain "view" is activated, then only the subgraph belonging to this view can be processed. Only the objects belonging to this subgraph are displayed, i.e., states with actions and/or transitions with switching conditions. Only these graphical objects can be modified. This has the advantage that, due to the deactivation of currently unneeded subprograms, the graphical objects belonging to the activated subprogram are present in a clearly arranged fashion, and processing of the same proceeds quickly and with no errors.

If, for example, in an "execution system" for graphs, a specific "view" is activated, then only the subgraph belonging to this "view" can be executed. Here, a "view" serves to define a subprogram of an overall program. Since the overall graph represents a control program particularly for a programmable controller, the graphical objects belonging to the subgraph exposed by a "view" represent a subprogram for the controller. This has the advantage that using the views, it is easy to activate or rather deactivate temporarily current subprograms of an overall program. The concept according to the invention of views controlled via program attributes is advantageous for all graphical programming languages in the application area of automation engineering.

The invention has the advantage that currently relevant aspects of an overall program can be filtered out in the form of subprograms and these subprograms can then be activated or rather deactivated. These subgraphs can also be drawn upon, for example, for presentation on a monitor, for printing documentation, for editing a graph control program, e.g., by inserting, modifying or deleting objects and much more. It is advantageous to automatically generate program code which is capable in particular of running on an automation system from the graphical objects in an overall program which are brought into interrelations with one another in an application-dependent manner. The graph then forms the sole and complete basis for program generation without further intermediate steps being necessary.

BRIEF DESCRIPTION OF THE DRAWINGS

The invention and advantageous specific embodiments of the same are explained in greater detail based on the examples shown in the figures and briefly explained hereafter.

DETAILED DESCRIPTION

The principle of the invention is explained hereafter based initially on a first example shown in FIGS. 2 to 7 which is highly simplified for explanation purposes.

Figure 2:
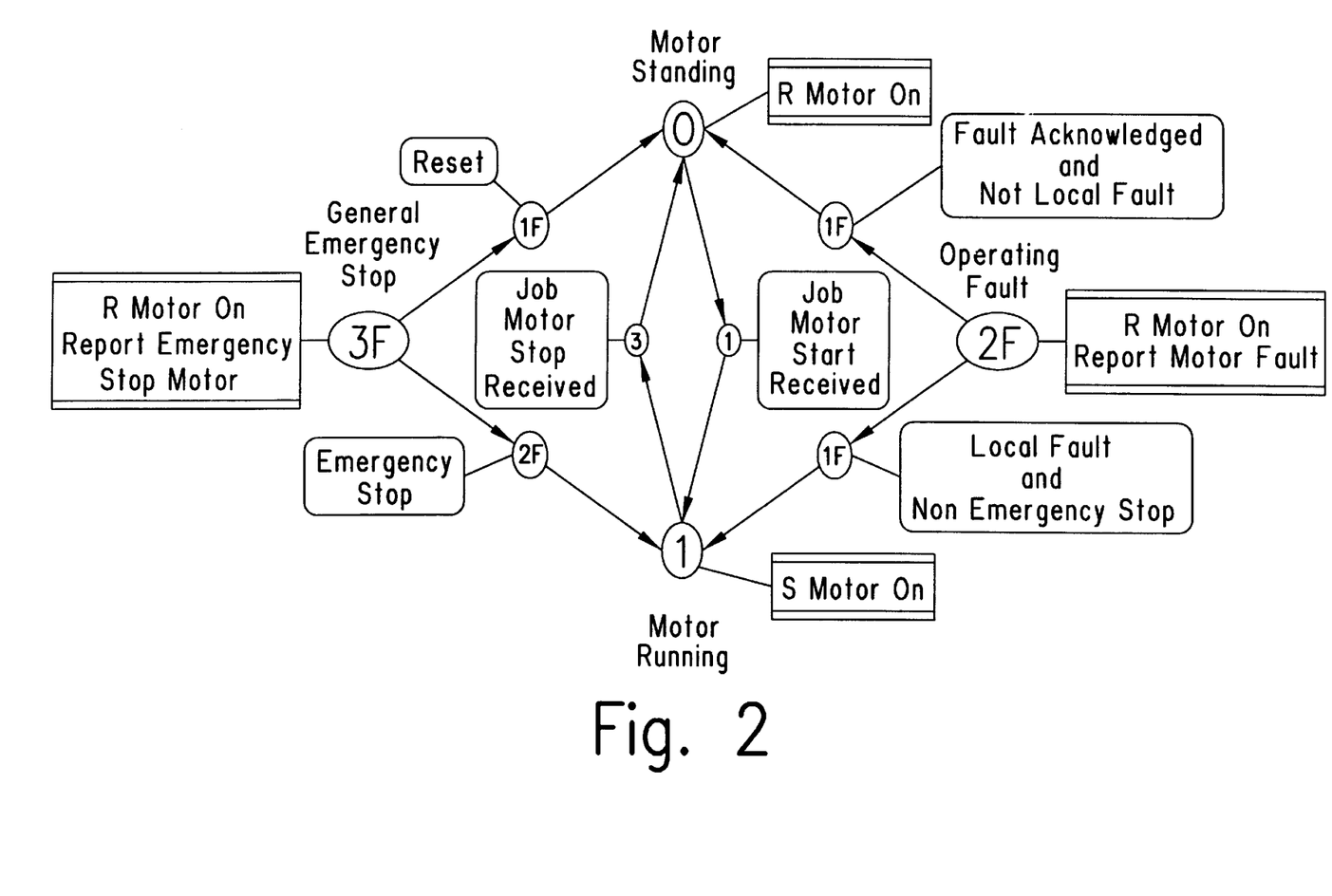
FIG. 2 illustrates an example of a simple state graph provided with program attributes for automating a motor according to the invention.

FIG. 2 shows the typical appearance of a state graph used to automate a motor in an exemplary fashion. The graph characterizes in full all stationary states and the dynamic behavior of the motor. If a suitably powerful system is available, the state graph with all objects can possibly serve simultaneously as an execution program for a programmable controller influencing the motor. Otherwise, it is easy to convert the state graph into an execution program for a programmable controller. Customarily, when automating a motor drive, different operating states must be taken into account, particularly in the form of operating modes of the related motor and fault cases.

In practice, there are various persons who must deal with the motor, which might represent a small part of a technical facility, under different and varying conditions. These persons include automation engineers during the planning phase, start-up specialists, maintenance specialists and workers at the technical facility, i.e., the users of the automated motor. Not all objects in the overall graph of FIG. 2 are relevant to each group of persons. In order to now be able to separate relevant subprograms for each respective person from this graph, program attributes are assigned to the existing graphical objects according to the invention.

Figure 3A:
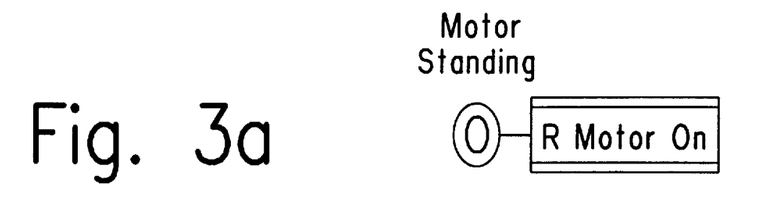
FIGS. 3a to 3d illustrate the "State" objects of the state graph from FIG. 2 with the associated "Action" objects which maintain the respective "State".
Figure 3B:
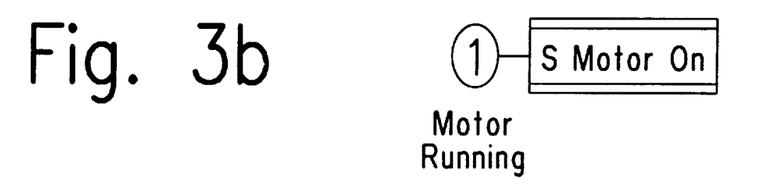
Figure 3C:
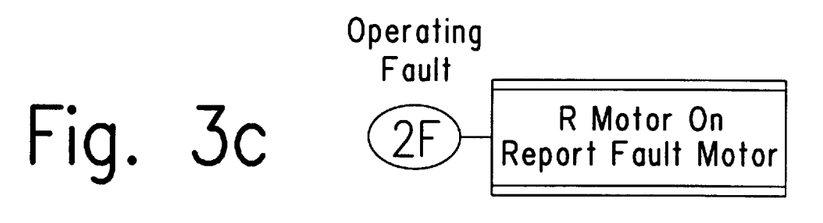
Figure 3D:
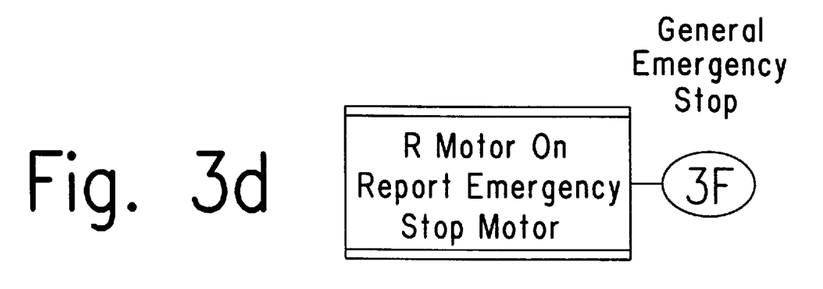

The graph presented in FIG. 2 consists of objects which, in the case of the present state graph, correspond to the type "State", "Action", "Transition" and "Switching Condition". For this purpose, in FIGS. 3a to 3d, the "State" objects of the graph from FIG. 2 are combined with the associated "Action" objects which maintain the respective "State". Moreover, the "State" objects are given a label for easier understanding. For example, FIG. 3a shows the first state 0 labelled "Motor Standing", for whose maintenance the "Action" RMotorOn, i.e., Reset Motor On, must be executed. FIG. 3b shows the complementary, second state 1 labelled "Motor Running", for whose maintenance the "Action" SMotorOn, i.e., Set Motor On, must be executed. FIG. 3c shows a third state 2F labelled "Operating Fault", for whose maintenance the "Actions" RMotorOn+ReportFaultMotor, i.e., Reset Motor On and Report Motor Fault must be executed. Finally, FIG. 3d shows a fourth state 3F labelled "General Emergency Stop", for whose maintenance the "Actions" RMotorOn+ReportEmergencyStopMotor, i.e., Reset Motor On and Report Motor Emergency Shut-off must be executed.

Figure 4A:
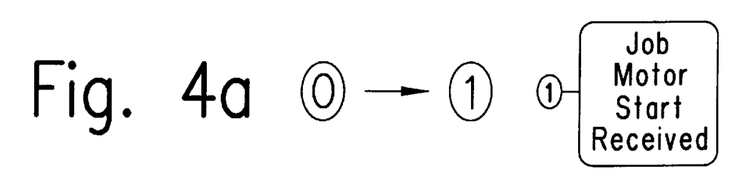
FIGS. 4a to 4f illustrate the "Transition" objects of the state graph of FIG. 2 with the associated "Switching Condition" objects which cause the respective "Transition".
Figure 4B:
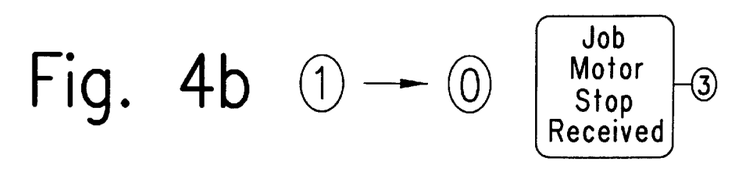
Figure 4C:
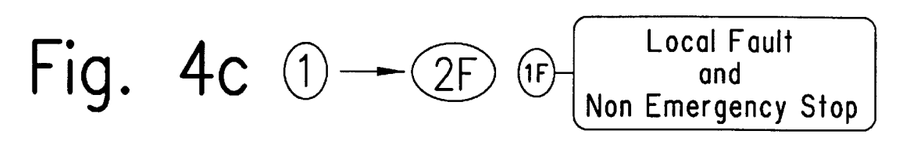
Figure 4D:
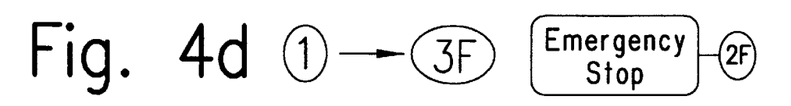
Figure 4E:
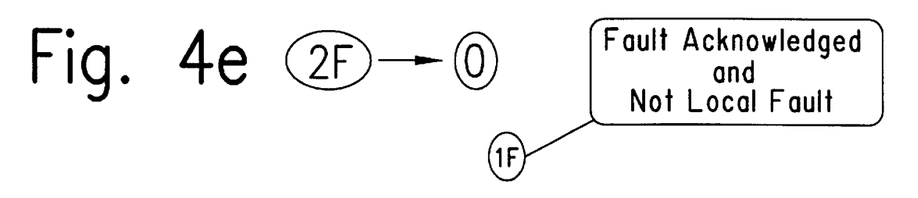
Figure 4F:
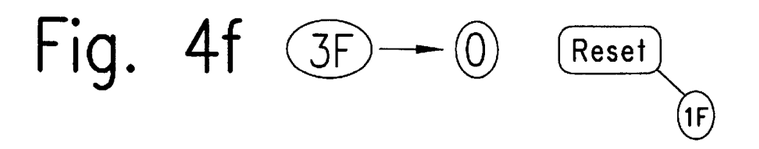

Moreover, in FIGS. 4a to 4f, the "Transition" objects of the state graph from FIG. 2 are exhibited with the related "Switching Condition" objects which cause the respective "Transition". For example, FIG. 4a shows the transition from state 0 to state 1 as the first transition. This is triggered when the switching condition "JobMotorStopReceived" is present. FIG. 4b shows as a further transition the transition from state 1 to state 0. This is triggered when the switching condition "JobMotorStartReceived" ["JobMotorStopReceived"] is present. FIG. 4c shows the transition from state 1 to state 2F. This is triggered when the switching condition "Local Fault and NotEmergencyStop" is present. FIG. 4d shows the transition from state 1 to state 3F. This is triggered when the switching condition "EmergencyStop" is present. FIG. 4e shows the transition from state 2F to state 0. This is triggered when the switching condition "Fault Acknowledged and NotLocalFault" is present. Finally, FIG. 4f shows the transition from state 3F to state 0. This is triggered when the switching condition "Reset" is present.

The consecutive numbering of the objects of type "Transition" emanating from an object of type "State" as 0,1,2, 3, . . . has the function of a priority. Thus, the graphical objects, which are interrelated in the overall program of FIG. 2 in an application-dependent manner, of a type, particularly the type "Switching Condition", have assigned to them a temporal processing sequence in the context of the execution of the related overall program.

Now, according to the invention, each object of the graph of FIG. 2, i.e., each "State" and each "Transition", "Action" and "Switching Condition" is assigned a so-called "program attribute". In the example shown in FIGS. 2 to 7, the program attributes "Basic" and "Fault" are provided for "States" and "Transitions". For example, the states 0,1 and the transitions 0 to 1 (1) and from 1 to 0 (3), which have no further identifiers, are assigned the program attribute "Basic". Moreover, the states 2F,3F and the transitions 1 to 2F (1F), 1 to 3F (2F), 3F to 0 (1F) and 2F to 0 (1F), recognizable through the additional identifier F, are assigned the program attribute "Fault". For objects of types "Action" and "Switching Conditions", the further program attribute "Visible" is provided. The result is the following table:

| Object: | Program attribute: |
| --- | --- |
| State 0: | Basic |
| State 1: | Basic |
| State 2: | Fault |
| State 3: | Fault |
| Actions for all states: | Visible |
| Transition from 0 to 1: | Basic |
| Transition from 1 to 0: | Basic |
| Transition from 1 to 2: | Fault |
| Transition from 1 to 3: | Fault |
| Transition from 3 to 0: | Fault |
| Transition from 2 to 0: | Fault |
| Switching conditions of all transitions: | Visible |

Figure 5:
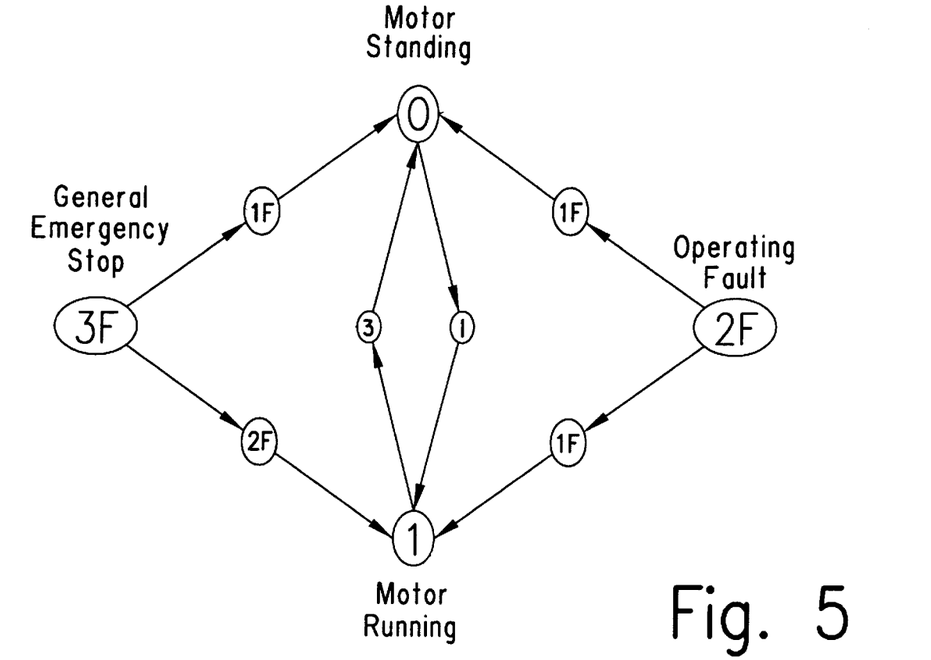
FIG. 5 illustrates a first "view" of the state graph of FIG. 2 formed through appropriate assignment and activation of program attributes, which can be used, for example, for "customer documentation".
Figure 6:
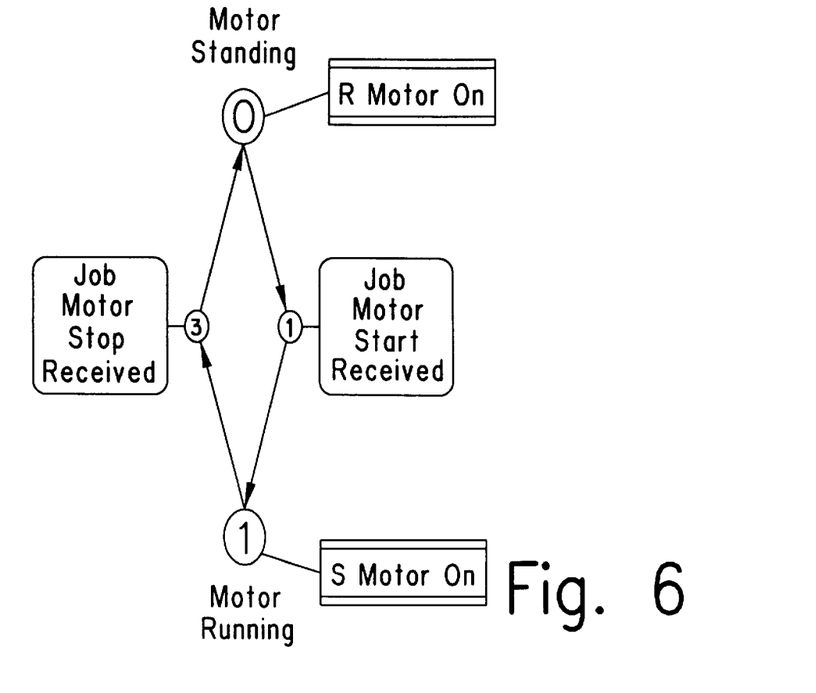
FIG. 6 illustrates a further "view" of the state graph of FIG. 2 formed through appropriate assignment and activation of program attributes, by way of which, for example, the "Normal" operating state of the motor is controlled.
Figure 7:
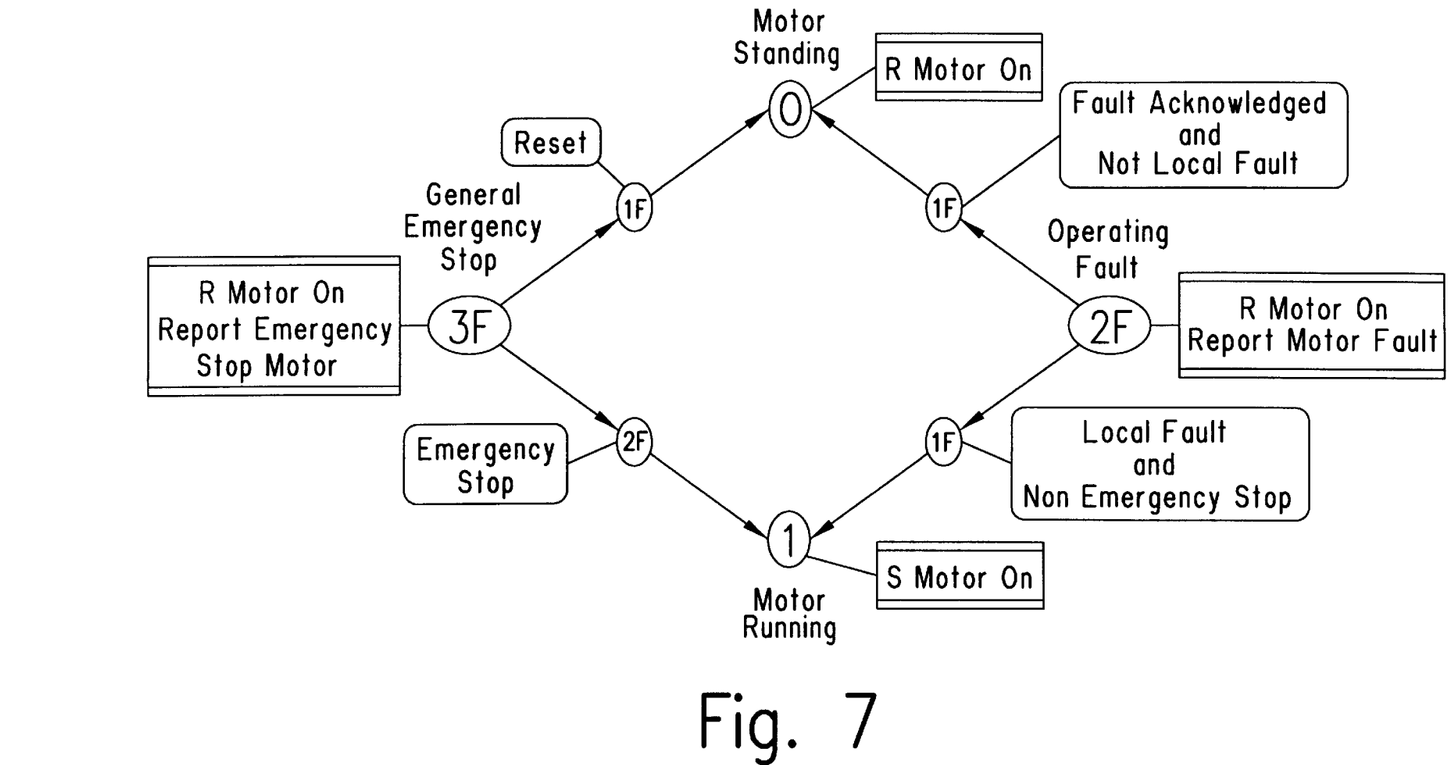
FIG. 7 illustrates a further "view" of the state graph of FIG. 2 formed through appropriate assignment and activation of program attributes, by way of which, for example, the "Fault" operating state of the motor is controlled.

According to the present invention, a "view" is activated through the application-dependent selection of zero, one or more program attributes. In FIGS. 5, 6, 7 the "views" of three subprograms are shown in an exemplary manner.

The "View2" presented in FIG. 5 shows a subgraph in which internal details of the motor control are deactivated, i.e., the objects of the type "Action" and "Switching Condition", and which characterizes essentially the external behavior of the motor. A view of this sort is thus executable as a subprogram for use in customer documentation or rather for demonstration purposes, for example. FIG. 6 "View3" shows the subgraph in which the objects determining the behavior of the motor in normal operation are activated, i.e., all objects without the program attribute "Fault". It thus forms a subprogram which can be labelled "Normal", which can be separately executed in practice without further ado even without the objects additionally present in FIG. 2. Finally, FIG. 7 "View4" shows the subgraph in which the objects determining the behavior of the motor in case of a fault are activated, i.e., all objects without the program attribute "Basic". It thus forms a subprogram which can be labelled "Fault". This subprogram is also separately executable, e.g., for test purposes, possibly without the objects which are additionally present in FIG. 2. Since FIG. 2 shows the overall graph of the motor control, which fully characterizes the static and dynamic behavior of the motor, this graph can also be considered "View1" which can be labelled "Everything". This "subprogram" in which all objects present in the exemplary motor control are activated is naturally separately executable by a programmable controller.

The views in FIGS. 2, 5, 6, 7 can be summarized as follows:

FIG. 2: View1=Σ objects with program attributes (basic, fault, visible)

FIG. 5: View2=Σ objects with program attributes (basic, fault)

FIG. 6: View3=Σ objects with program attributes (basic, visible)

FIG. 7: View4=Σ objects with program attributes (fault, visible) plus all state objects which border such an object, e.g., the states 0, 1.

Basically, each subgraph or rather the associated subprogram can form a possible "view". Thus, the set of possible "views" is by no means restricted to the examples shown in FIGS. 2 and 5 to 7. Preferably for use in the automation of technical systems and processes, the following objects of a state graph can generally be combined preferably into a "view":

a) Set of all objects of type "State" whose program attributes belong to the currently selected set of program attributes of the view, e.g., all "States" having the program attributes "Normal" and/or "Fault", b) Additionally the set of all objects of type "Transition" whose program attributes belong to the currently selected set of program attributes of the view, e.g., all "Transitions" having the program attributes "Normal" and/or "Fault", c) Additionally the set of all objects of type "State" which represent start nodes or end nodes of "Transitions" which belong to the selection of "Transitions" defined under b), and d) For the case in which the program attribute "Visible" is also available: All "Actions" and "Switching Conditions" which are assigned to objects of type "State" and "Transition" which belong to a selection of objects defined under a, b) or c).

Figure 8:
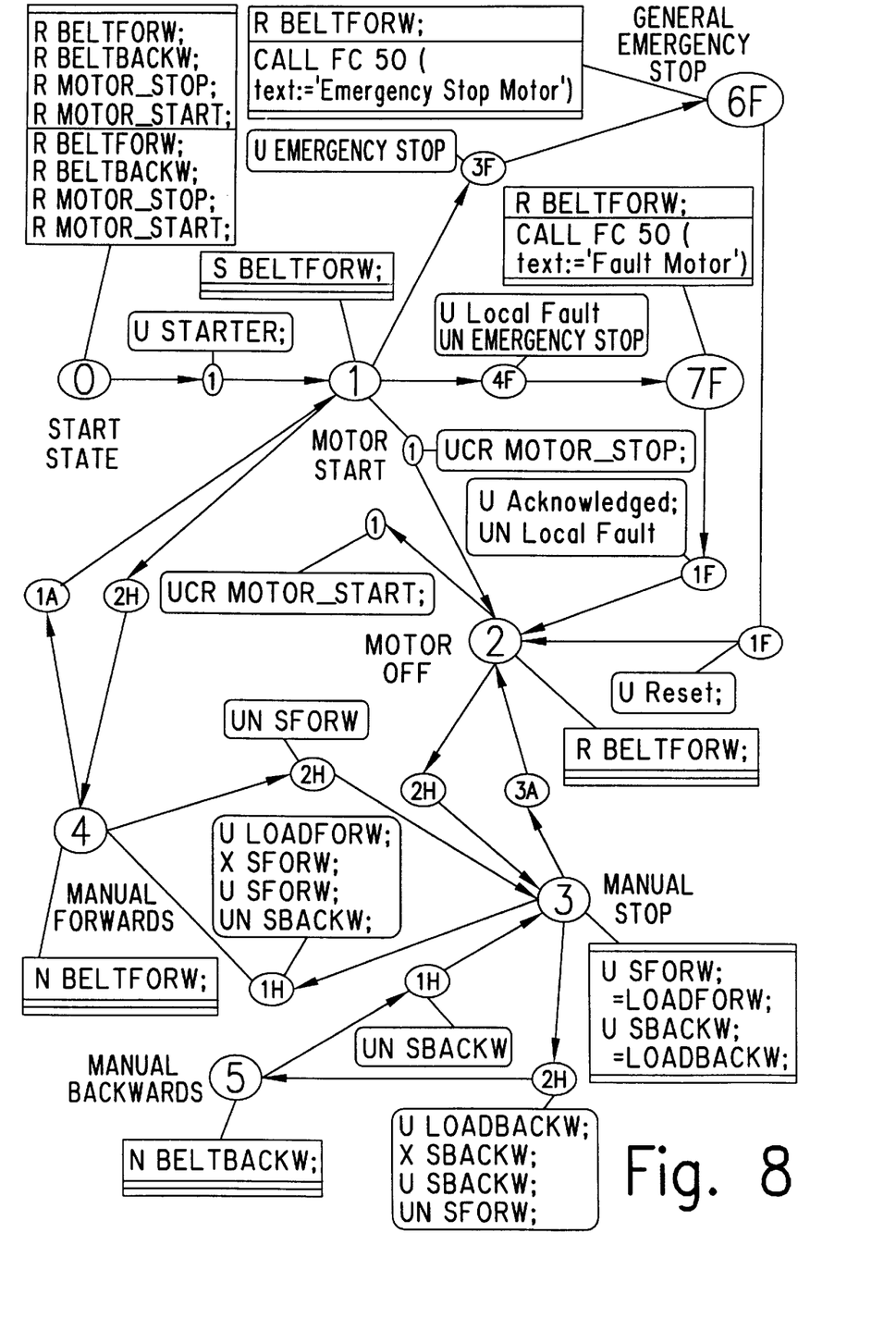
FIG. 8 illustrates a further exemplary state graph having according to the invention the additional program attributes "Manual" and "Automatic" for automating a motor-driven conveyor belt.

In FIG. 8 a complex graph relating to the automation of a conveyor belt is shown in an exemplary manner. The "State" objects 0,1,2,3,4,5 have in turn the program attribute "Basic" assigned to them, and the "State" objects 6F, 7F the program attribute "Fault". Analogously, "Transition" objects without an additional identifier have the program attribute "Basic", and "Transition" objects marked with F, e.g., 1F, 3F, 4F have the program attribute "Fault". Going over and beyond this, for "Transition" objects the further program attributes "Manual" and "Automatic" are provided. This is recognizable in FIG. 8 through the additional identifiers H, ("H" corresponds to "Manual") and A, ("A" corresponds to "Automatic"). Thus, three "Transition" objects 1 are assigned the program attribute "Basic", two "Transition" objects 1A, 3A the program attribute "Automatic", several "Transition" objects 1H, 2H the program attribute "Manual" and several "Transition" objects 1F, 3F, 4F the program attribute "Fault".

Figure 9:
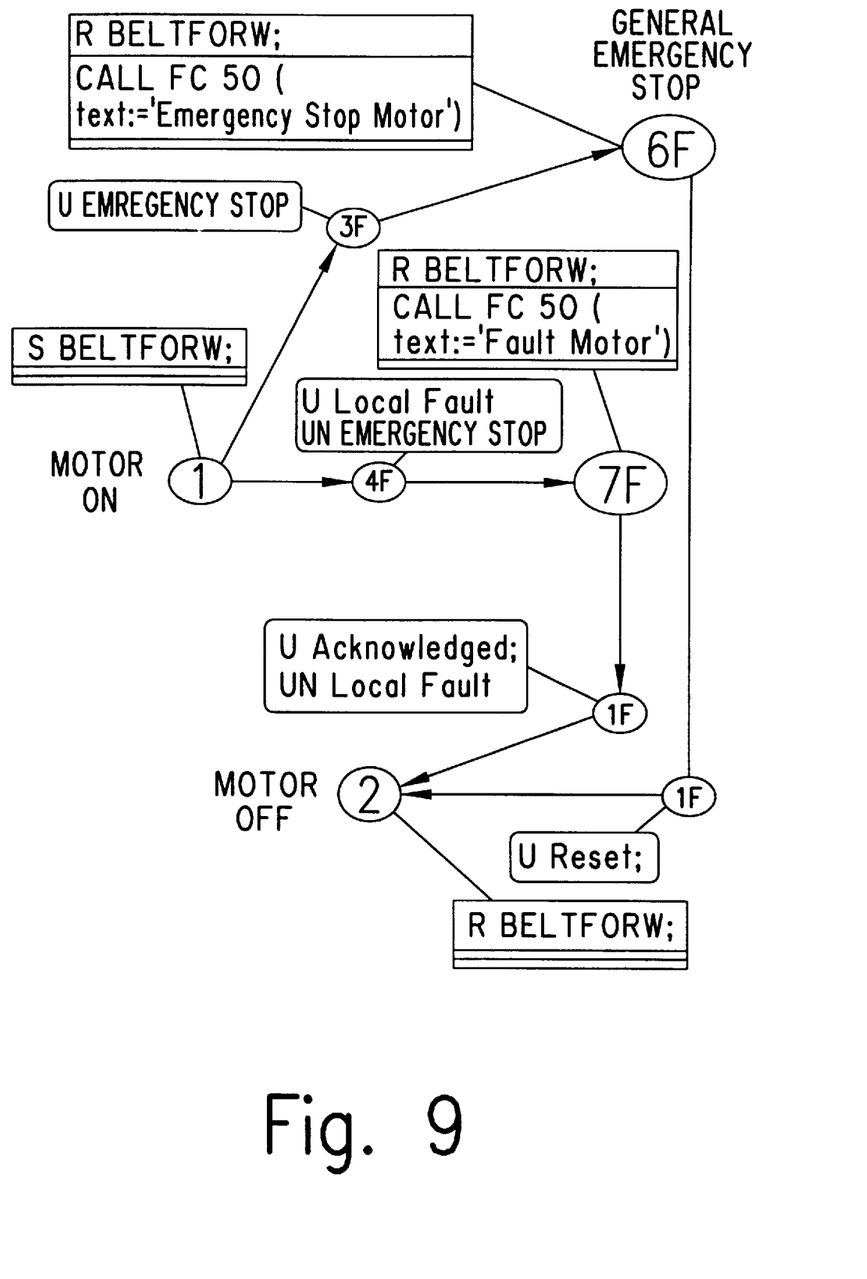
FIG. 9 illustrates a first "view" of the state graph of FIG. 8 formed through appropriate assignment and activation of program attributes, by way of which, for example, the "Fault" operating state of the belt is controlled.

FIG. 9 shows in an exemplary manner a "view" in which all objects of type "State" and "Transition" provided with the program attribute "Fault" are activated. Additionally, the "State" objects 1, 2 are activated since they form a start or rather end node for objects of type "Transition" provided with the program attribute "Fault". Moreover, all objects of type "Action" and "Switching Condition" which are assigned to the above named activated objects of type "State" and "Transition" are also activated.

Figure 10:
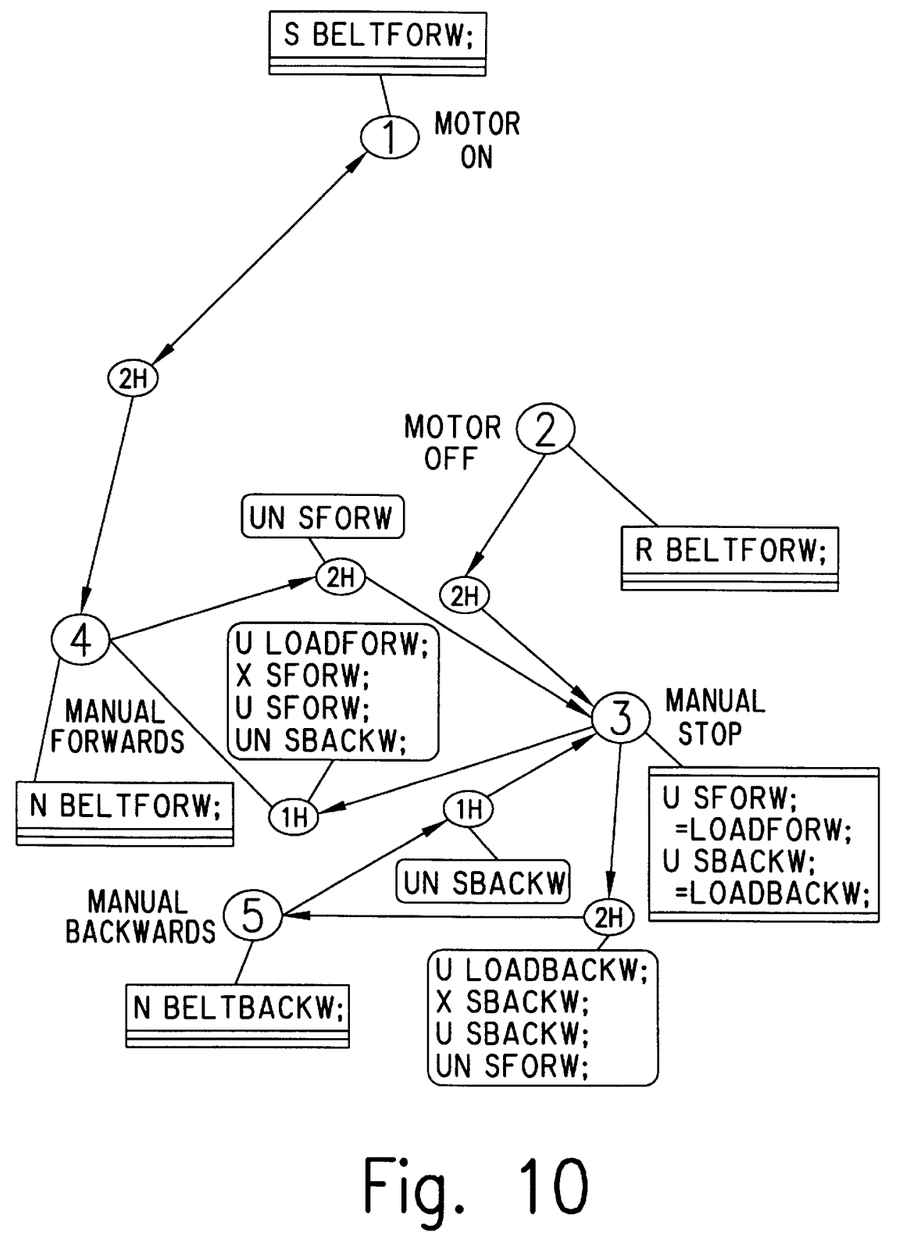
FIG. 10 illustrates a further "view" of the state graph of FIG. 8 formed through appropriate assignment and activation of program attributes, by way of which, for example, the "Manual" operating state of the belt is controlled.

Finally, FIG. 10 shows in an exemplary manner a "view" in which all objects of type "Transition" provided with the program attribute "Manual" are activated. Additionally, the "State" objects 1,2,3,4,5 are activated since they form a start or rather end node for objects of type "Transition" provided with the program attribute "Manual". Moreover, all objects of type "Action" and "Switching Condition" which are assigned to the above named activated objects of type "Transition" and "State" are also activated.

What is claimed is:

1. A method for activating or deactivating subprograms in a process controlling program, the method comprising the steps of:

providing graphical object types for creating the program, the graphical object types being elements of a programming system based on state graphs;

providing program attribute types for creating the program;

interrelating each of the graphical object types with another one of the graphical object types in an application-dependent manner for creating the program;

assigning a program attribute corresponding to the program attribute types in an application-dependent manner to each one of the graphical object types;

from the program, combining the graphical object types having predetermined program attributes of the program attribute types in an application-dependent manner into one of an activatable view and a deactivatable view representing the subprograms; and automatically generating program code from the graphical object types which are interrelated with one another in the application-dependent manner, wherein the program code runs on an automation system.

2. The method according to claim 1, wherein the graphical object types include a state type, an action type, a transition type, and a switching condition type.

3. The method according to claim 2, wherein the transition type of the graphical object types are assigned priorities for the purpose of specifying a temporal sequence in an execution of the program.

4. The method according to claim 1, wherein the transition type of the graphical object types are assigned priorities for the purpose of specifying a temporal sequence in an execution of the program.

5. The method according to claim 1, wherein the program attribute types include a basic type, a fault type, an automatic type, a manual type, and a visible type.

* * * * *